(12) United States Patent
Zhang et al.

(10) Patent No.: US 9,964,683 B2
(45) Date of Patent: May 8, 2018

(54) LIGHT GUIDE PLATE, BACKLIGHT MODULE AND LIQUID CRYSTAL MODULE

(71) Applicants: BOE TECHNOLOGY GROUP CO., LTD., Beijing (CN); BEIJING BOE DISPLAY TECHNOLOGY CO., LTD., Beijing (CN)

(72) Inventors: Yu Zhang, Beijing (CN); Wenwen Ma, Beijing (CN); Lili Jia, Beijing (CN); Qing Ma, Beijing (CN); Daekeun Yoon, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 143 days.

(21) Appl. No.: 14/339,584

(22) Filed: Jul. 24, 2014

(65) Prior Publication Data

US 2015/0253490 A1 Sep. 10, 2015

(30) Foreign Application Priority Data

Mar. 10, 2014 (CN) .......................... 2014 1 0085489

(51) Int. Cl.
*F21V 8/00* (2006.01)
*G02F 1/1335* (2006.01)

(52) U.S. Cl.
CPC .......... *G02B 6/0041* (2013.01); *G02B 6/0078* (2013.01); *G02B 6/0035* (2013.01)

(58) Field of Classification Search
CPC .... G02B 6/0041; G02B 6/005; G02B 6/0078; G02F 1/1336

(Continued)

(56) References Cited

U.S. PATENT DOCUMENTS 7,441,934 B2 * 10/2008 Scholl .................. G02B 6/0041
362/610
2001/0030860 A1 * 10/2001 Kimura ................ G02B 6/0028
362/620

(Continued)

FOREIGN PATENT DOCUMENTS

| CN | 101389899 A | 3/2009 |
|---|---|---|
| CN | 101825804 A | 9/2010 |

(Continued)

OTHER PUBLICATIONS

First Office Action regarding Chinese application No. 201410085489.7, dated Nov. 25, 2015. Translation provided by Dragon Intellectual Property Law Firm.

(Continued)

*Primary Examiner* — Alexander Garlen
*Assistant Examiner* — Eric T Eide
(74) *Attorney, Agent, or Firm* — Harness, Dickey & Pierce, P.L.C.

(57) ABSTRACT

The present disclosure discloses a light guide plate, a backlight module and a liquid crystal module. The light guide plate includes a plurality of light guide blocks; the light guide blocks are doped with scattering particles. Since the light guide plate includes a plurality of light guide blocks, this can simplify the cutting of the light guide plate and the making of grid points. The light guide blocks are doped with scattering particles, so that most of rays incident upon the light guide blocks are scattered in a preset direction and guided to a middle part and the light-far end of the backlight module to compensate the brightness of the middle part and the light-far end, thus making the brightness of the side light type backlight display uniform.

6 Claims, 2 Drawing Sheets

(58) Field of Classification Search
USPC .......................................... 362/616, 316, 84
See application file for complete search history.

(56) References Cited

U.S. PATENT DOCUMENTS

| | | | | |
|---|---|---|---|---|
| 2008/0278640 | A1* | 11/2008 | Ijzerman | G02B 5/0242 349/15 |
| 2009/0034230 | A1* | 2/2009 | Lim | G02B 6/0028 362/84 |
| 2009/0059554 | A1* | 3/2009 | Skipor | G06F 1/3218 362/614 |
| 2009/0161341 | A1* | 6/2009 | Meir | G02B 6/0041 362/84 |
| 2011/0007520 | A1* | 1/2011 | Shigeta | G02B 6/0053 362/607 |
| 2014/0300528 | A1* | 10/2014 | Ebisui | G02B 27/2214 345/32 |
| 2015/0241621 | A1* | 8/2015 | Inui | G02F 1/133615 349/65 |
| 2015/0247964 | A1* | 9/2015 | Kamada | G02B 6/0043 349/65 |

FOREIGN PATENT DOCUMENTS

| | | |
|---|---|---|
| CN | 102241977 A | 11/2011 |
| CN | 102713412 A | 10/2012 |
| JP | 2009104911 A | 5/2009 |
| JP | 2011187300 A | 9/2011 |

OTHER PUBLICATIONS

Second Office Action regarding Chinese application No. 201410085489.7, dated May 11, 2016. Translation provided by Dragon Intellectual Property Law Firm.

Third Office Action regarding Chinese application No. 201410085489.7, dated Aug. 9, 2016. Translation provided by Dragon Intellectual Property Law Firm.

Fourth Office Action regarding Chinese application No. 201410085489.7, dated Feb. 4, 2017. Translation provided by Dragon Intellectual Property Law Firm.

* cited by examiner

LIGHT GUIDE PLATE, BACKLIGHT MODULE AND LIQUID CRYSTAL MODULE

CROSS-REFERENCE TO RELATED APPLICATION

This application claims priority to Chinese Patent Application No. 201410085489.7 filed on Mar. 10, 2014, the disclosures of which are incorporated in their entirety by reference herein.

TECHNICAL FIELD

The present disclosure relates to the field of liquid crystal display technique, and more particularly to a light guide plate, a backlight module and a liquid crystal module.

BACKGROUND

Since the liquid crystal itself does not emit light, an external backlight source is required to realize the display in various Liquid Crystal Display (LCD) devices such as a liquid crystal display, a liquid crystal TV. The backlight source is divided into two types based on distribution locations: the side light type backlight source and the direct-type backlight source. The side light type backlight source is widely applied in the small size and medium size LCDs due to advantages of reduced number of required light-emitting devices, low cost and thin thickness.

FIG. 1 shows a partial sectional diagram of a side light type backlight module. The side light type backlight module includes, from down to up, a backboard 1, a light guide plate 2 and an optical membrane material 3 arranged above the backboard 1 in turn, a backlight source 6 arranged adjacent to a side face of the light guide plate 2 and a plastic frame 4 for fixing the light guide plate 2 and the optical membrane material 3. A display panel 5 is arranged above the backlight module. The light guide plate 2 is used to guide and conduct rays from a light-near end to a light-far end. Grid points are also printed on a lower surface of the light guide plate 2 which is opposite to a light exit face, so that an entire light exit face is uniform to form a surface light source which is provided to the display panel 5 for displaying.

However, since the light guide plate 2 is limited to materials and pattern adjustment, the light exit face of the light-near end emits more rays, and the picture is brighter; but the light exit face of a middle part and the light-far end emits less rays, and the picture is darker. This phenomenon is especially obvious for oversized products. Furthermore, there is a problem for the large-sized light guide plate 2 that the cutting of the light guide plate 2 and the making of the grid points are difficult.

SUMMARY

The present disclosure provides a light guide plate, which can solve problems that the brightness of the side light type backlight display is uneven and the cutting of the large-sized light guide plate and the making of grid points are difficult.

The present disclosure further provides a backlight module and a liquid crystal module which adopt the above light guide plate, to improve the brightness uniformity of the side light type backlight display and simplify the processes for cutting the light guide plate and making grid points.

In order to solve the above technical problems, in one aspect, the present disclosure provides a light guide plate, which includes a plurality of light guide blocks; wherein the light guide blocks are doped with scattering particles.

In another aspect, the present disclosure provides a backlight module, which includes a backboard, a light guide plate arranged on the backboard and a backlight source arranged adjacent to a side face of the light guide plate; the light guide plate includes a plurality of light guide blocks, and the light guide blocks are doped with scattering particles.

In still another aspect, the present disclosure further provides a liquid crystal module which adopts the above backlight module.

The beneficial effects of the above technical solutions of the present disclosure are as follows.

In the above technical solutions, since the light guide plate of the backlight module includes a plurality of light guide blocks, this can simplify the cutting of the light guide plate and the making of grid points. The light guide blocks are doped with scattering particles, so that most of rays incident upon the light guide blocks are scattered in a preset direction and guided to a middle part and the light-far end of the backlight module to compensate the brightness of the middle part and the light-far end, thus making the brightness of the side light type backlight display uniform.

BRIEF DESCRIPTION OF THE DRAWINGS

In order to illustrate technical solutions according to embodiments of the present disclosure or in the prior art more clearly, drawings to be used in the description of the prior art or the embodiments will be described briefly hereinafter. Apparently, the drawings described hereinafter are only some embodiments of the present disclosure, and other drawings may be obtained by those skilled in the art according to those drawings without creative work.

DETAILED DESCRIPTION

It should be noted that, in one embodiment of the present disclosure, a light-far end refers to, in a backlight module, an end at which an end face of a light guide plate far away from a backlight source is located; and a light-near end refers to an end at which an end face of the light guide plate facing to the backlight source is located.

Embodiments of the present disclosure provides a light guide plate, a backlight module and a liquid crystal module for solving the problems that the side light type backlight display in the prior art has relatively high brightness at the light-near end and relatively low brightness at the middle part and the light-near end, and the cutting of the light guide plate and the making of grid points are difficult when the product size is large. It may simplify the cutting of the light guide plate and the making of grid points by setting that the light guide plate includes a plurality of light guide blocks. Further, the light guide blocks are doped with scattering particles, so that most of rays incident upon the light guide blocks are scattered in a preset direction and guided to the middle part and the light-far end of the backlight module to compensate the brightness at the middle part and the light-far end, thus making the brightness of the side light type backlight display uniform.

In order to make objects, technical solutions and advantages of the embodiments of the present disclosure more clear, the technical solutions according to embodiments of the present disclosure will be clearly and fully described hereinafter in conjunction with the accompanying drawings in the embodiments of the present disclosure. Apparently, the embodiments are only some of the embodiments of the present disclosure, rather than all the embodiments. Based on the described embodiments of the present disclosure, all other embodiments that are acquired by those skilled in the art without inventive work are all within the scope of protection of the present disclosure.

First Embodiment

Figure 1:
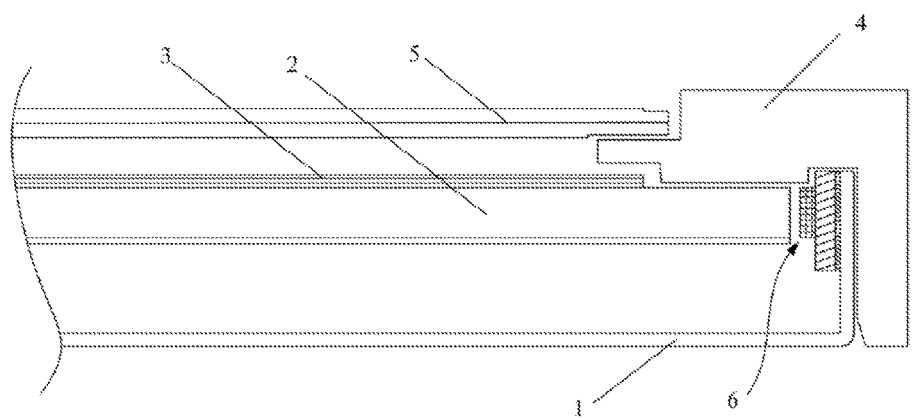
FIG. 1 is a schematic partial structural diagram showing a side light type backlight display in the prior art.
Figure 2:
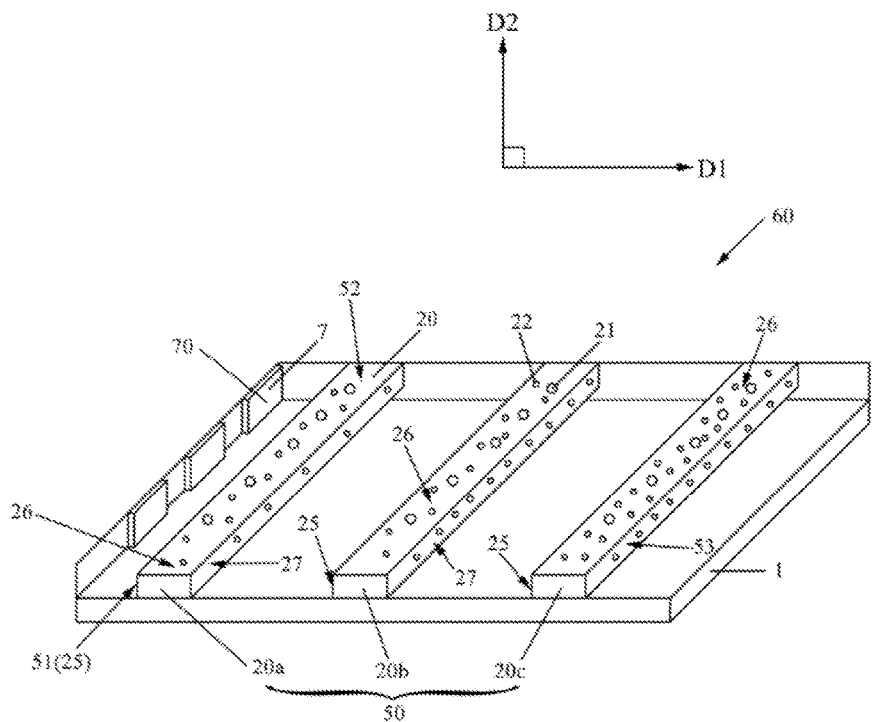
FIG. 2 is a schematic partial structural diagram showing a side light type backlight module according to one embodiment of the disclosure.

As shown in FIG. 2, one embodiment of the present disclosure provides a light guide plate 50, which is used in a backlight module 60, particularly a side light type backlight module. When the light guide plate 50 is used in the backlight module 60, a backlight source 7 of the backlight module 60 which emits rays is arranged adjacent to a side face of the light guide plate 50. The light guide plate 50 has an incident face 51 and a light exit face 52 adjacent to the incident face 51. Rays emitted by the backlight source 7 are incident upon the light guide plate 50 from the incident face 51, guided through the light guide plate 50, and emitted from the light exit face 52 to form a surface light source which is provided to a display panel of the backlight module 60 for displaying.

Figure 3:
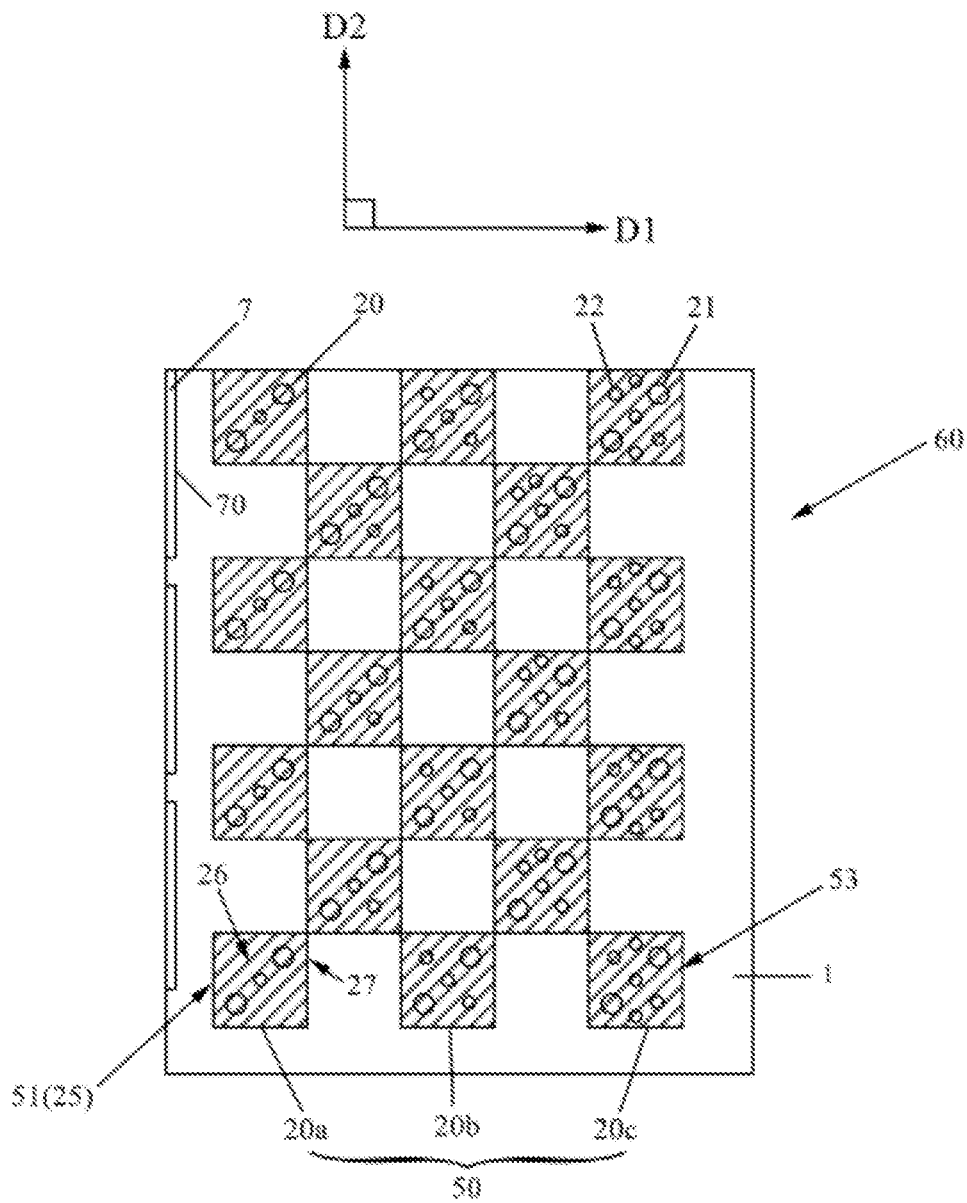
FIG. 3 is a schematic partial structural diagram showing a side light type backlight module according to another embodiment of the present disclosure.

Specifically, in conjunction with FIG. 2 and FIG. 3, the light guide plate 50 has a light-near end (i.e., the incident face 51) and a light-far end 53. The light-near end faces to an end surface 70 of the backlight source 7. The light-far end 53 is far away from the end surface 70 of the backlight source 7. The light guide plate 50 includes a plurality of light guide blocks 20, and these light guide blocks 20 are arranged at intervals along a first direction D1 which is from the light-near end of the light guide plate 50 to the light-far end 53 of the light guide plate 50. Since the light guide plate 50 includes a plurality of light guide blocks 20 which are arranged at intervals along the first direction D1, this can simplify the cutting of a large-sized light guide plate and the making of grid points.

The light guide blocks 20 are also doped with scattering particles 21, so that most of rays incident upon the light guide blocks 20 are scattered in a preset direction and guided to a middle part and the light-far end 53 of the backlight module 60 to compensate the brightness at the middle part and the light-far end 53, thus making the brightness of the side light type backlight display uniform.

Furthermore, the light guide blocks 20 are also doped with light-emitting particles 22. For example, the light-emitting particles 22 may be some alkali metal particles. When excited by external photons, excited atoms may jump from high energy level to low energy level, and simultaneously radiate photons and emit rays. Further, the doping densities of the light-emitting particles 22 in the plurality of light guide blocks 20 are different with each other. For example, the doping densities of the light-emitting particles 22 in the plurality of light guide blocks 20 are gradually increased from the light-near end to the light-far end 53, thus the brightness of the display may be improved, and the brightness uniformity of the display may be also improved and simultaneously the overall power consumption of the backlight module 60 may be reduced. In other words, the doping densities of the light-emitting particles 22 in the light guide blocks 20 are gradually increased with increasing distance between each light guide block 20 and the backlight source 7, i.e., the doping densities of the light-emitting particles 22 in the light guide blocks 20 are gradually increased along the first direction D1.

In the above-described technical solutions, since the light guide plate 50 includes a plurality of light guide blocks 20 which are arranged at intervals along the first direction D1, this can simplify the cutting of the light guide plate 50 and the making of grid points. Further, the light guide blocks 20 are doped with scattering particles 21, so that most of rays incident upon the light guide blocks 20 are scattered in a preset direction and guided to a middle part and the light-far end 53 of the backlight module 60 to compensate the brightness of the middle part and the light-far end 53, thus making the brightness of the side light type backlight display uniform.

Specifically, the scattering particles 21 are Mie-like scattering particles, and the radius thereof approximates or is greater than wavelengths of incident rays. Most of the incident rays may be scattered in an incidence direction of the rays under the action of the Mie-like scattering particles 21, and this phenomenon is referred to as Mie-like scattering. Further, when the incident rays are natural lights, the scattered rays in the incidence direction of the rays and an opposite direction are also natural lights, and color cast changes will not occur.

Therefore, when the light guide blocks 20 are doped with Mie-like scattering particles 21, most of the rays incident upon the light guide blocks 20 are scattered in the incidence direction of the rays, guided to the middle part and the light-far end of the backlight module 60, that is, the preset direction is the incidence direction of the rays incident upon the light guide block 20.

Accordingly, each light guide block 20 includes a first light exit face 26, an incident face 25 and a second light exit face 27. The incident face 25 and the second light exit face 27 are adjacent to the first light exit face 26. In each light guide block 20, the incident face 25 and the second light exit face 27 are at two sides of each light guide block 20 in the first direction D1, and the incident face 25 is closer to the backlight source 7 than the second light exit face 27. The first light exit faces 26 of the light guide blocks 20 together form the light exit face 52 of the light guide plate 50.

A specific light path between two adjacent light guide blocks 20 is: the rays of the backlight source 7 are incident upon the light guide block 20 through the incident face 25, rays emitted from the first light exit face 26 are projected on the display panel, and rays emitted from the second light exit face 27 are projected on the incident face 25 of an adjacent light guide block 20 in the first direction D1. For example, as shown in FIG. 2, the light guide plate 50 includes a first light guide block 20a, a second light guide block 20b and a third light guide block 20c. The first light guide block 20a, the second light guide block 20b and the third light guide block 20c are arranged at intervals in the first direction D1. The rays of the backlight source 7 are incident upon the first light guide block 20a through the incident face 25 of the first light guide block 20a, rays emitted from the first light exit face 26 of the first light guide block 20a are projected on the display panel, and rays emitted from the second light exit face 27 of the first light guide block 20a are projected on the incident face 25 of the second light guide block 20b. Similarly, rays emitted from the second light exit face 27 of the second light guide block 20b are projected on the incident face 25 of the third light guide block 20c.

Optionally, a light deflection structure (not shown in drawings) such as a micro-prism array which has a light-gathering function is formed on the first light exit face 26 of each light guide block 20, so as to improve light-emitting efficiency and simultaneously improve the light-emitting uniformity of the backlight module 60.

Second Embodiment

In conjunction with FIG. 2 and FIG. 3, one embodiment of the present disclosure provides a backlight module 60, particularly a side light type backlight module. The backlight module 60 includes a backboard 1, a light guide plate 50 arranged on the backboard 1 and a backlight source 7 arranged adjacent to a side face of the light guide plate 50 (i.e., the incident face 51 of the light guide plate 50). The light guide plate 50 has an incident face 51 and a light exit face 52 adjacent to the incident face 51. Rays emitted by the backlight source 7 are incident upon the light guide plate 50 from the incident face 51, guided through the light guide plate 50, and emitted from the light exit face 52 to form a surface light source which is provided to the display panel for displaying.

Specifically, the light guide plate 50 has a light-near end (i.e., the incident face 51 of the light guide plate 50) and a light-far end 53. The light-near end faces to an end surface 70 of the backlight source 7. The light-far end 53 is far away from the end surface 70 of the backlight source 7. The light guide plate 50 includes a plurality of light guide blocks 20, and these light guide blocks 20 are arranged at intervals along a first direction D1 which is from the light-near end of the light guide plate 50 to the light-far end 53 of the light guide plate 50. Since the light guide plate 50 includes a plurality of light guide blocks 20 which are arranged at intervals along the first direction D1, this can simplify the cutting of a large-sized light guide plate and the making of grid points.

Further, the light guide blocks 20 are doped with scattering particles 21, so that in a first light guide block 20a and a second light guide block 20b adjacent to each other in a preset direction, most of rays incident upon the first light guide block 20a closer to the backlight source 7 are scattered in the preset direction, and the scattered rays are incident upon the second light guide block 20b. Thus, most of rays incident upon the light guide block 20 are guided to the middle part and the light-far end 53 of the backlight module 60 to compensate the brightness of the middle part and the light-far end 53, thus making the brightness of the side light type backlight display uniform.

Furthermore, the light guide blocks 20 are also doped with light-emitting particles 22. For example, the light-emitting particles 22 may be some alkali metal particles. When excited by external photons, excited atoms may jump from high energy level to low energy level, and simultaneously radiate photons and emit rays. Further, the doping densities of the light-emitting particles 22 in the plurality of light guide blocks 20 are different with each other. For example, the doping density of the light-emitting particles 22 in the first light guide block 20a is lower than the doping density of the light-emitting particles 22 in the second light guide block 20b, that is, the doping densities of the light-emitting particles 22 in the plurality of light guide blocks 20 are gradually increased from the light-near end to the light-far end 53, thus the brightness of the display may be improved, and the brightness uniformity of the display may also be improved. In other words, the doping densities of the light-emitting particles 22 in the light guide block 20 are gradually increased with increasing distance between each light guide block 20 and the backlight source 7, i.e., the doping densities of the light-emitting particles 22 in the light guide blocks 20 are gradually increased along the first direction D1.

It should be noted that, the introduction of the first light guide block 20a, the second light guide block 20b and the third light guide block 20c may not be a limitation, but for convenience of description.

In the above-described technical solutions, since the light guide plate 50 of the backlight module 60 includes a plurality of light guide blocks 20 which are arranged at intervals along the first direction D1, this can simplify the cutting of the light guide plate 50 and the making of grid points. Further, the light guide blocks 20 are doped with scattering particles 21, so that most of rays incident upon the light guide blocks 20 are scattered in the preset direction and guided to the middle part and the light-far end 53 of the backlight module 60 to compensate the brightness of the middle part and the light-far end 53 with a more uniform surface light source being provided, thus making the brightness of the side light type backlight display uniform.

Specifically, the scattering particles 21 are Mie-like scattering particles, and most of the rays incident upon the light guide blocks 20 are scattered in the incidence direction of the rays, guided to the middle part and the light-far end 53 of the backlight module 60, that is, the preset direction is the incidence direction of the rays incident upon the light guide block 20.

Accordingly, each light guide block 20 includes a first light exit face 26 and an incident face 25 and a second light exit face 27. The incident face 25 and the second light exit face 27 are adjacent to the first light exit face 26. In each light guide block 20, the incident face 25 and the second light exit face 27 are at two sides of each light guide block 20 in the first direction D1, and the incident face 25 is closer to the backlight source 7 than the second light exit face 27. The first light exit faces 26 of the light guide blocks 20 together form the light exit face 52 of the light guide plate 50.

In the incidence direction of the rays incident upon the light guide block 20, a specific light path between adjacent light guide blocks 20 is: the rays are incident upon the first light guide block 20a closer to the backlight source 7 through the incident face 25, rays emitted from the first light exit face 26 of the first light guide block 20a are projected on the display panel, and rays emitted from the second light exit face 27 of the first light guide block 20a are projected on the incident face 25 of the second light guide block 20b.

Optionally, a light deflection structure (not shown in drawings) such as a micro-prism array which has a light-gathering function is formed on the first light exit face 26 of each light guide block 20, so as to improve light-emitting efficiency and simultaneously improve the light-emitting uniformity of the backlight module 60.

Furthermore, since adjacent light guide blocks 20 are distributed on the backboard 1 with being staggered with each other, this facilitates heat dissipation; meanwhile, this may reduce the weight of the backlight module 60 and reduce cost when obtaining light guide plates of the same size.

In a specific embodiment, as shown in FIG. 2, the light guide block 20 has a strip shape in a second direction D2 which is parallel to the backboard 1 and perpendicular to the first direction D1. A plurality of light guide blocks 20 are distributed at intervals in parallel on the backboard 1 from one side close to the backlight source 7 to another side far away from the backlight source 7. Generally, the parallel distribution refers to that long edges of the light guide blocks 20 are parallel. Taking a 32-inch display product as an example, the overall size thereof is 735.4 mm (length)×433 mm (width), the size of the light guide plate is 716.9 mm (length)×411.3 mm (width), and a spacing distance between the light guide plate 50 and the light-emitting face (i.e., the end surface 70) of the backlight source 7 is 0.63 mm. When the light guide plate 50 includes a plurality of strip-shaped light guide blocks 20, the spacing distance between the light guide plate 50 and the light-emitting face (i.e., the end surface 70) of the backlight source 7 is 0.63 mm and keeps unchanged. In order to simplify the process, sizes of the plurality of light guide blocks 20 are designed to be the same, specifically, 230 mm (length)×411.3 mm (width). The light guide plate 50 includes three light guide blocks 20 arranged at the light-near end 51, middle and light-far end 53 respectively, and the spacing distance between the light guide blocks 20 is 13.5 mm. In subsequent product applications, the sizes of the strip-shaped light guide blocks 20 may be designed in accordance with product sizes.

In another specific embodiment, a shown in FIG. 3, the light guide block 20 has a square shape. The plurality of light guide blocks 20 are distributed at intervals along the first direction D1, and are simultaneously distributed at intervals along the second direction D2. From one side close to the backlight source 7 to one side far away from the backlight source 7, i.e., along the first direction D1, adjacent light guide blocks 20 among the plurality of light guide blocks 20 distributed in the same row are spaced by a distance of one light guide block 20. In the second direction D2, every two adjacent rows of light guide blocks 20 are staggered by the distance of one light guide block 20 in the first direction D1; positions of light guide blocks 20 in every two interlaced rows in the second direction D2 are column aligned. Still taking a 32-inch display product as an example, in order to guarantee the picture quality thereof, the size of the square-shaped light guide blocks 20 is preferably designed to be 80 mm (length)×78 mm (width), and at this point the picture quality is best. In subsequent product applications, the size of the square-shaped light guide blocks 20 may be designed in accordance with the product size and the picture quality.

Third Embodiment

This embodiment provides a liquid crystal module, specifically, a liquid crystal display device. The liquid crystal module adopts the backlight module 60 according to the second embodiment. Since the backlight module 60 provides a surface light source having uniform brightness distributions, therefore the brightness of the liquid crystal module is uniform, and the display quality of the liquid crystal module is improved.

The forgoing are only exemplary embodiments of the present disclosure. It should be noted that, for those skilled in the art, improvements and substitutions may also be made without departing from the principle of the present disclosure. Those improvements and substitutions should also be considered as the scope of the present disclosure.

What is claimed is:

1. A backlight module, comprising:
a backboard, a plurality of light guide blocks arranged directly on the backboard, and a backlight source arranged directly adjacent to a side face of the plurality of light guide blocks,
wherein each of the light guide blocks is doped with scattering particles; and
each of the light guide blocks is doped with light-emitting particles,
the plurality of light guide blocks have a light-near end and a light-far end,
the light-near end faces the backlight source,
the light-far end is away from the backlight source,
the light guide blocks are arranged at intervals on the backboard along a first direction that is from the light-near end to the light-far end,
every two adjacent ones of the light guide blocks are separated from each other along the first direction by an empty channel, and are directly adjacent to each other with the empty channel between them,
the backlight source and the light guide blocks are at an identical side of the backboard, and
wherein each light guide block has a strip-shape in a second direction that is perpendicular to the first direction and parallel to the backboard, and the light guide blocks are distributed in parallel on the backboard; and each light guide block has a length of 230 mm and a width of 411.3 mm;
wherein the light guide blocks are distributed in parallel on the backboard with a spacing distance between adjacent light guide blocks being 13.5 mm.

2. The backlight module according to claim 1, wherein the plurality of light guide blocks have a light-near end and a light-far end; the light-near end faces the backlight source; the light-far end is away from the backlight source; the light guide blocks are arranged at intervals on the backboard along a first direction that is from the light-near end to the light-far end; and
wherein in each of the light guide blocks, the scattering particles and the light-emitting particles are mixed dispersed.

3. The backlight module according to claim 2, wherein doping densities of the light-emitting particles in the light guide blocks are different, and the light-emitting particles are made of photoluminescent material.

4. The backlight module according to claim 3, wherein the doping densities of the light-emitting particles in the light guide blocks are increased along the first direction.

5. The backlight module according to claim 2, wherein:
each light guide block comprises a first light exit face, an incident face and a second light exit face;
in each light guide block, the incident face and the second light exit face are adjacent to the first light exit face;
in each light guide block, the incident face and the second light exit face are at two sides of each light guide block in the first direction; and
the first light exit faces of the light guide blocks together form a light exit face of the backlight module.

6. A liquid crystal module comprising the backlight module according to claim 1.

* * * * *